(12) United States Patent
Chen

(10) Patent No.: US 7,420,374 B2
(45) Date of Patent: Sep. 2, 2008

(54) BATTERY WITH REMAINING ELECTRICAL POWER DISPLAY FUNCTION AND METHOD OF THE SAME

(75) Inventor: Wei-jou Chen, Taoyuan (TW)

(73) Assignees: QISDA Corporation, Taoyuan (TW); Benq Corporation, Taipei (TW)

( * ) Notice: Subject to any disclaimer, the term of this patent is extended or adjusted under 35 U.S.C. 154(b) by 310 days.

(21) Appl. No.: 11/009,446

(22) Filed: Dec. 10, 2004

(65) Prior Publication Data

US 2005/0174093 A1  Aug. 11, 2005

(30) Foreign Application Priority Data

Feb. 11, 2004  (TW) .............................. 93103244 A

(51) Int. Cl.
*G01N 27/416* (2006.01)
*G01N 27/42* (2006.01)
*H02J 7/00* (2006.01)

(52) U.S. Cl. ...................... 324/427; 324/425; 324/426; 324/428; 324/429; 324/430; 324/431; 324/432; 324/433; 320/132

(58) Field of Classification Search .................. 320/132; 324/425–433
See application file for complete search history.

(56) References Cited

U.S. PATENT DOCUMENTS

| 5,606,242 | A | * | 2/1997 | Hull et al. | ..................... 320/106 |
| 6,092,294 | A |   | 7/2000 | Mak | ............................ 33/18.1 |
| 6,110,538 | A | * | 8/2000 | Sheridon | ..................... 427/457 |
| 6,124,851 | A | * | 9/2000 | Jacobson | ..................... 345/206 |

* cited by examiner

*Primary Examiner*—Matthew V Nguyen
*Assistant Examiner*—Jue Zhang
(74) *Attorney, Agent, or Firm*—Birch, Stewart, Kolasch & Birch, LLP

(57) ABSTRACT

This invention provides an electronic device that has a battery with a power storage unit and a display module, a power detector and a display control module. The power storage unit is for storing electrical power and the display module is placed on the surface of the battery. The power detector is selectively coupled to the battery, and generates a remaining power signal after detecting the remaining power in the battery. The remaining power signal is used to control the display control module. When the power detector is selectively coupled to the battery, the display module shows the current remaining power in response to the action of the display control module. When the power detector is separated from the battery, the display module is essentially capable of maintaining the showing of remaining power.

17 Claims, 9 Drawing Sheets

BATTERY WITH REMAINING ELECTRICAL POWER DISPLAY FUNCTION AND METHOD OF THE SAME

BACKGROUND OF THE INVENTION

1. Field of the Invention

This present invention provides a combination of an electronic device and a battery which is capable of displaying the remaining power.

2. Description of the Prior Art

With the improvement of technology, bulky electronic equipments are gradually becoming mini and portable. The portable power supply of the electronic equipment is one that got transformed along with this trend. Originally, most electronic equipments operate through a socket to provide power, but nowadays portable storage units, like battery or others, are replacing the way of providing power. The development of the electronic equipment is not only towards being mini in size but also multi-function, so that power demand is also on the rise. For example, different kinds of power-consuming portable electronic equipments, such as cell phones and digital cameras, often use replaceable and rechargeable batteries as the power source, so that the user can replace with a plurality of rechargeable batteries during the long period of usage and continually extend the operating period.

When the user uses plural batteries, the user often needs to tell how much power is left in the batteries that are not yet placed on the electronic equipment, so as to recharge the batteries that are low in power or choose the fully charged ones to be used. However, the battery of prior art must be placed on the electronic equipment to detect the amount of remaining power and to indicate that through the display unit of the electronic equipment, so that the remaining power can be displayed. The battery of prior art cannot display the remaining power of the battery itself through the appearance of the battery, and that causes inconvenience for the user.

SUMMARY OF THE INVENTION

The objective of the present invention is to provide an electronic device with battery and a method to display remaining power in the electronic device, and when the battery is separated from the electronic device, the battery is still capable of displaying the remaining power.

The electronic device of the present invention comprises a battery and a display control module. The battery comprises a power storage unit and a display module. The power storage unit is for storing electrical power, and the display module is placed on the surface of the battery. The power detector is selectively coupled to the battery. After detecting the battery, the power detector can generate a remaining power signal. The remaining power signal is used to control a display control module. When the battery is selectively coupled to the power detector, the display module is under the effect of the display control module to show a remaining power display corresponding to the remaining power signal. After the battery is separated from the power detector, the display module is out of the effect of the display control module but substantially keeps showing the remaining power display of the battery.

Compared with the prior art, the present invention provides a battery which is capable of displaying the remaining power and the method of displaying power. The prevent invention enables the user to know the remaining power of the battery without having to place the battery in an electronic device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
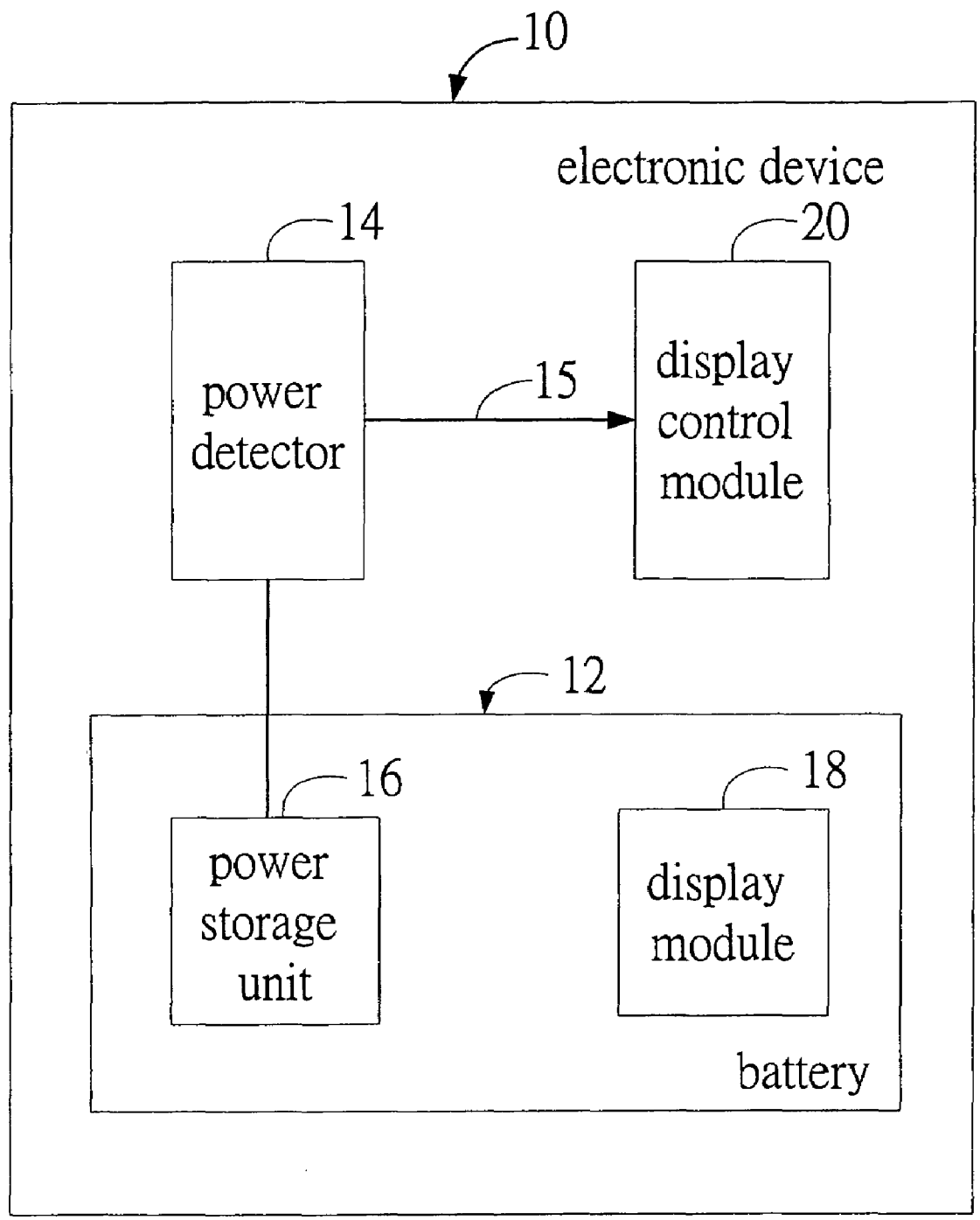
FIG. 1 is a schematic diagram showing an electronic device 10 of the present invention.

Please refer to FIG. 1; FIG. 1 is a schematic diagram showing an electronic device 10 of the present invention. The electronic device 10 comprises a battery 12, for storing electrical power to serve the electronic device 10, and a power detector 14, for detecting the power of the battery. The battery 12 is selectively coupled to the electronic device 10 in a detachable way for providing power to the electronic device 10, and, meanwhile, the power detector 14 is selectively coupled to the battery 12 and the electronic device 10 for detecting the remaining power. After detecting the remaining power of the battery 12, the power detector 14 generates a remaining power signal 15 that indicates the electrical power stored in the battery 12.

The battery 12 comprises a power storage unit 16 and a display module 18. The power storage unit 16 is for storing the electrical power. The display module 18 is placed on the surface of the battery 12 for showing a remaining power display of the power storage unit 16. The electronic device 10 further comprises a display control module 20. When the battery 12 is selectively coupled to the power detector 14, the display module 18 is under the effect of the display control module 20 to show the remaining power display corresponding to the remaining power signal 15. When the battery 12 is separated from the power detector 14, the display module 18 is out of the effect of the display control module 20 but substantially keeps showing the remaining power display.

Figure 2:
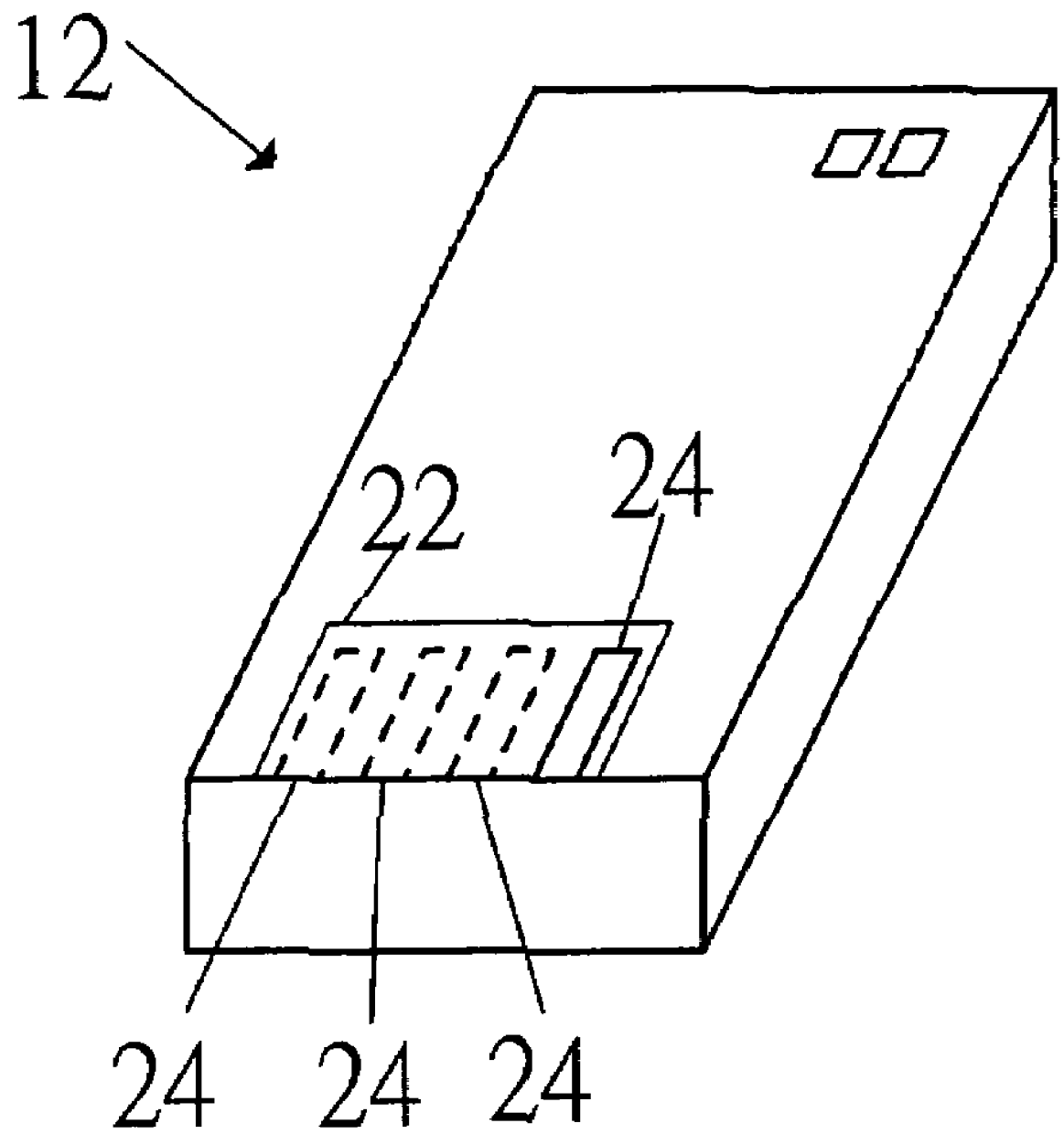
FIG. 2 is a schematic diagram of the battery shown in FIG. 1.

Please refer to FIG. 2; FIG. 2 is a schematic diagram of the battery shown in FIG. 1. In an embodiment of the present invention, the display module of the battery 12 is a magnetic powder plate 22. The magnetic powder plate 22 comprises four magnetic display units 24. The magnetic display units 24 are in the shape of a sheet, which can bend according to the magnetic power it encounters. In an embodiment, the magnetic display units 24 can be a drafting board, which is disclosed in U.S. Pat. No. 6,092,294. The magnetic display units 24 are capable of displaying in the two states of black and white and switch between the two states according to magnetic effect. The magnetic display units 24 are hollow with metal powder inside. When the magnetic force is coming from above the magnetic display units 24, the metal powder is attracted and sticks to the upper surface of the magnetic display units 24, so as to make the magnetic display units 24 appearing in the state of black. On the contrary, when the magnetic force is coming from below the magnetic display units 24, the metal powder is attracted, detaches from the upper surface of the magnetic display units 24, and sticks to the lower surface of the magnetic display units 24, so as to make the magnetic display units 24 appearing in the state of white. Before the influence from another magnetic force, the magnetic display units 24 will remain in the state of black or the state of white. As shown in FIG. 2, there is only one magnetic display unit 24 in the state of black in the magnetic powder plate 22, and there are three magnetic display units 24 in the state of white.

Figure 3:
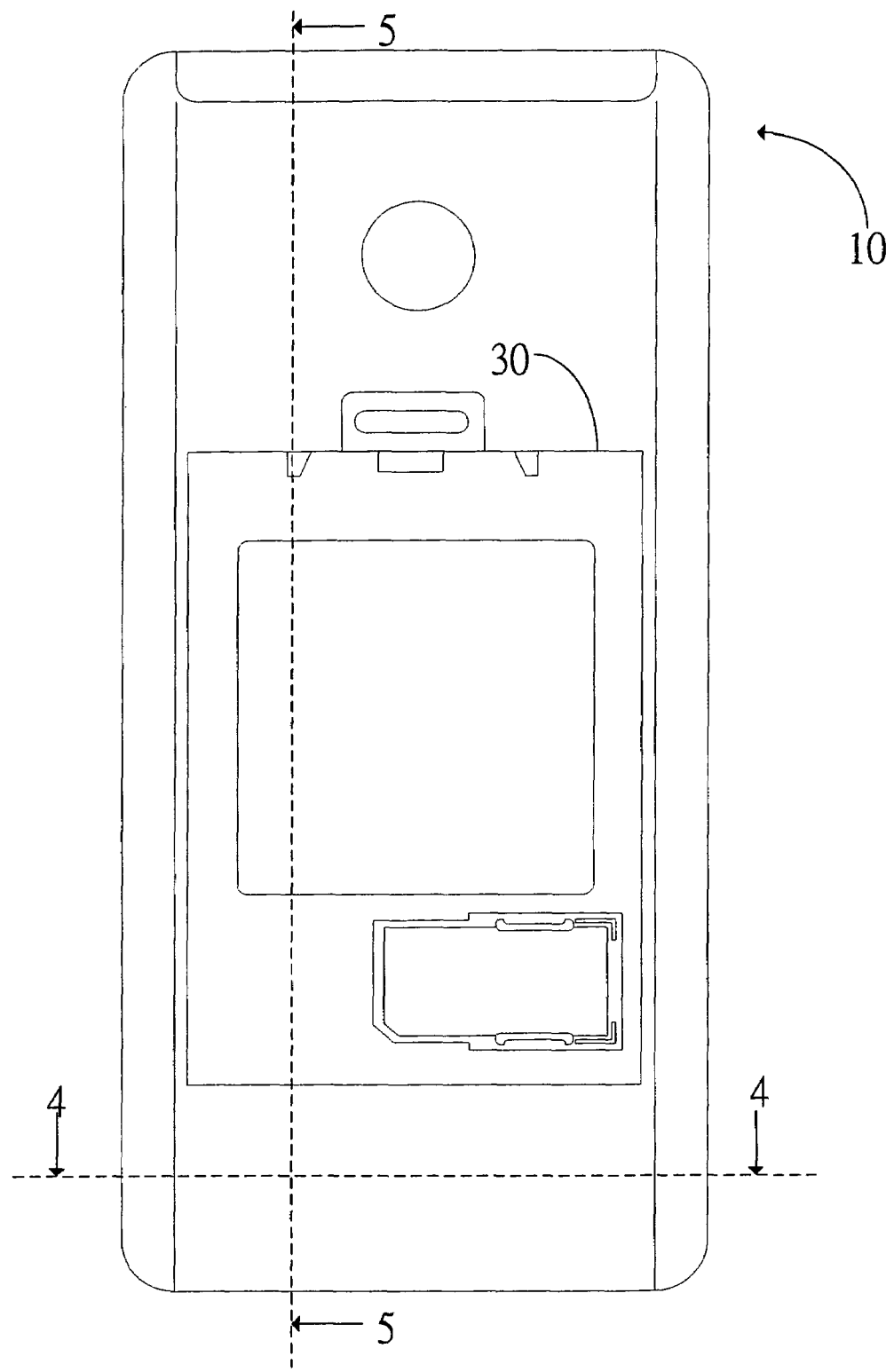
FIG. 3 is a schematic diagram of the electronic device shown in FIG. 1.
Figure 4:
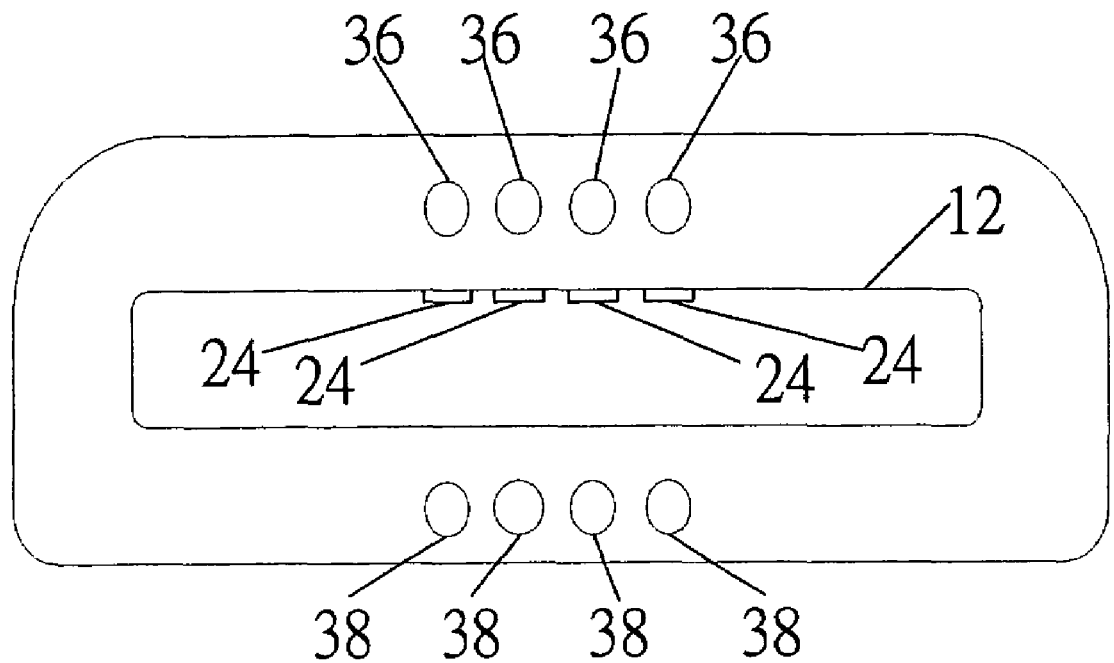
FIG. 4 is a section view along the line 4-4 of the battery slot as shown in FIG. 3.
Figure 5:
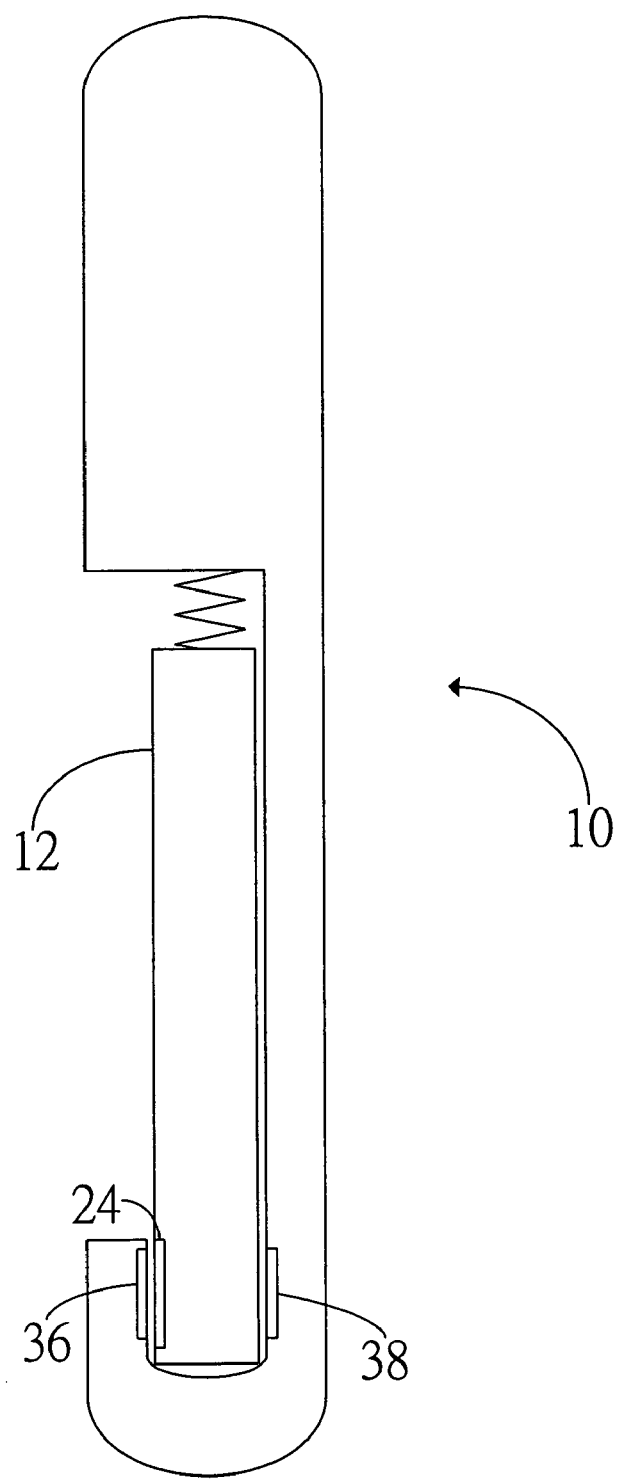
FIG. 5 is a section view along the line 5-5 of a battery slot as shown in FIG. 3.

Please refer to FIG. 3, FIG. 4, and FIG. 5. FIG. 3 is a schematic diagram of the electronic device 10 shown in FIG. 1; FIG. 4 is a section view along the line 4-4 of a battery slot 30 as shown in FIG. 3, and FIG. 5 is a section view along the line 5-5 of a battery slot 30 as shown in FIG. 3. The present invention can be applied in a portable electronic device, such as a portable communication device. In an embodiment of the present invention, the electronic device 10 is a cell phone. In this embodiment, the electronic device 10 comprises a battery slot 30 for placing the battery 12 (not shown in FIG. 3). As shown in FIG. 4, the display control module 20 of the electronic device 10 comprises four displaying electromagnets 36 and four erasing electromagnets 38. FIG. 4 only shows the main devices related to the present invention but do not show the others.

As shown in FIG. 5, when the battery 12 is placed in the battery slot 30, the magnetic display units 24 of the battery 12 corresponds to the displaying electro-magnet 36 above and the erasing electromagnet 38 below the magnetic display units. The displaying electromagnet 36 is used to switch the magnetic display units 24 from the state of white to the state of black, and the erasing electromagnet 36 is used to switch the magnetic display units 24 from the state of black to the state of white.

Please refer to FIG. 1. In an embodiment of the present invention, when the electronic device 10 is used, the power detector 14 continually monitors the remaining power of the battery and selectively outputs the remaining power signal 15 to the display control module 20, so as to change the displaying state of the display module 18. Using the display module 18 with the four magnetic display units 24 as an example, the power detector 14 monitors and records the power of the battery 12, and then according to the proportion of the remaining power, it determines the number of magnetic display units 24 out of the four that should remain in the state of black. For example, when the remaining power is lower than three-fourths, the four magnetic display units 24 display three of them in the state of black, and when the remaining power is lower than half, the four magnetic display units 24 display two of them in the state of black. In other words, when the remaining power decreases or increases, the power detector 14 outputs the remaining power signal 15 to the display control module 20, so as to enable the display module 18 to correspond to the effect of the display control module 20 and to display the corresponding remaining power.

The remaining power signal 15 comprises a plurality of sub remaining power signals. Each sub remaining power signal individually corresponds to and magnetizes a displaying electromagnet 36, so as to control the display of displaying state of a magnetized magnetic display unit 24. Furthermore, each sub remaining power signal individually corresponds to and magnetizes the erasing electromagnet 38, so as to control the erasing of the displaying state of a demagnetized magnetic display unit 24. Thus, the displaying states of black or white of the magnetic display units 24 are responsible for accurately displaying the remaining power of the battery 12 together. The displaying electro-magnet 36 and the erasing electromagnet 38 are usually non-electrified, and when the magnetic display units 24 need to change the displaying state, at least one of the displaying electro-magnet 36 and the erasing electro-magnet 38 will be electrified for generating magnetic force.

In the other embodiment of the present invention, the display module 18 is similar to an electrical paper, disclosed in U.S. Pat. No. 6,124,851, and the display control module 20 is the control module of the electrical paper. As above, the power detector 14 outputs the remaining power signal 15 to the display control module 20 for controlling the display module 18.

Figure 6:
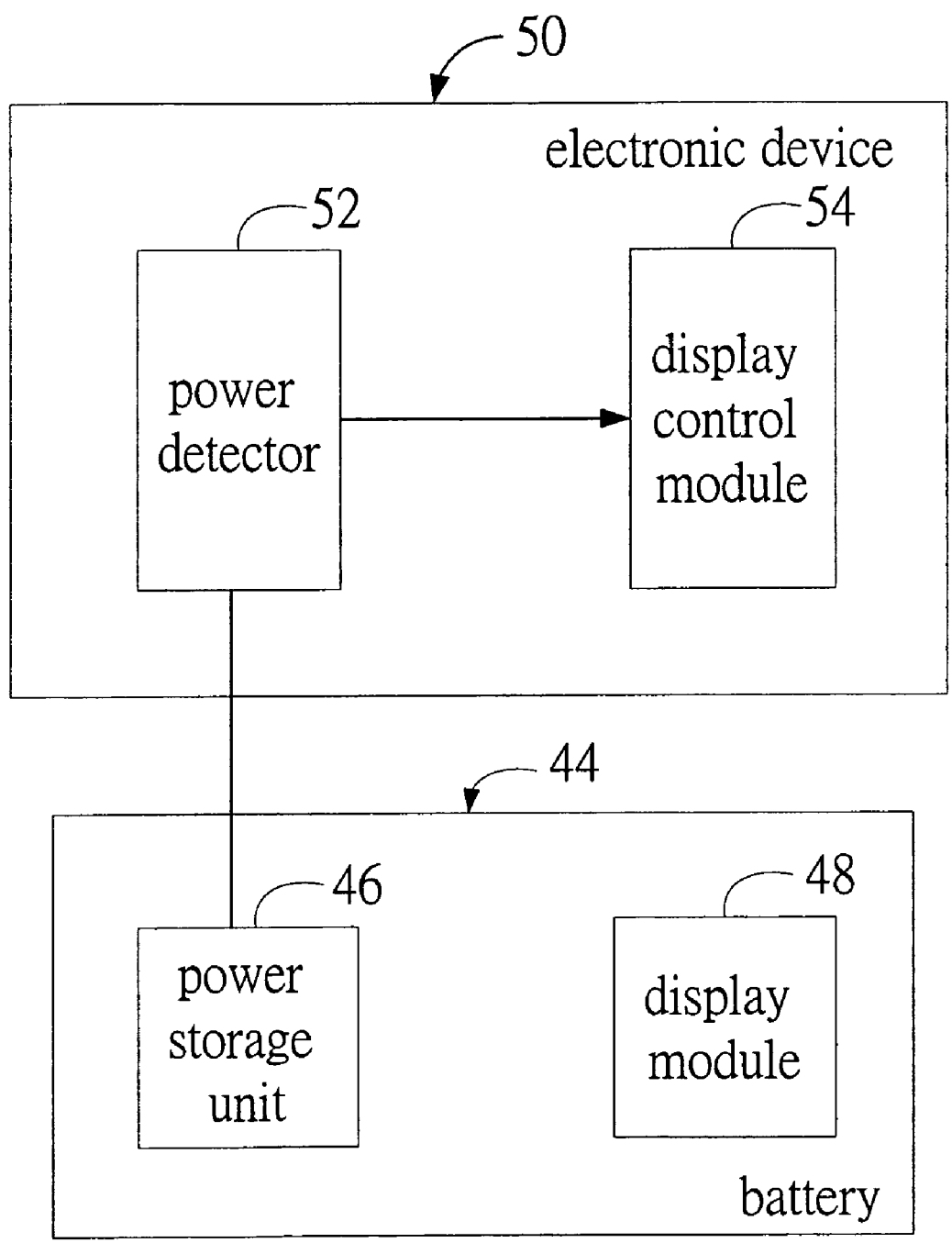
FIG. 6 is a schematic diagram of a combination of an electronic device and a battery of the prevent invention.

Please refer to FIG. 6; FIG. 6 is a schematic diagram of a combination of an electronic device 50 and a battery 44 of the present invention. The present invention provides a combination of an electronic device and a battery. In an embodiment, the combination comprises the battery 44; and it also comprises a power detector 52 and a display control module 54 that are both placed on the electronic device 50. The combination and function of the battery 44 are similar to the battery 12 of the embodiment of FIG. 1 and will not be further explained here.

The power detector 52 is selectively coupled to the battery 44, and it detects the remaining power of the battery 44. A display control module 54 is selectively coupled to the power detector 52 and controls the display module 48 positioned within an exerting range to switch between a first displaying state and a second displaying state.

When the battery 44 is selectively coupled to the electronic device 50, the power detector 52 is capable of detecting the remaining power of the power storage unit 46. When the power detector 52 detects that the power of the battery 44 is higher than a predetermined value, the power detector 52 outputs a first signal to control the display control module 54, so as to enable the display module 48 to display the first state. On the contrary, when the power detector 52 detects that the power of the battery 44 is lower than a predetermined value, the power detector 52 outputs a second signal to control the display control module 54, so as to enable the display module 48 to show the second state.

The display control module 54 is usually non-electrified. When the first signal or the second signal is received, the display control module 54 is electrified to switch the display state of the display module 48. That is, the display module 48 needs to switch between the first displaying state and the second displaying state.

After the battery 44 is detached from the electronic device 50, the display module 48 is beyond the control of the display control module 54, but the display module 48 still essentially remains in either the first displaying state or the second displaying state.

In an embodiment, the display module 48 is a magnetic powder plate, as mentioned before, and the display control module 54 is an electromagnet. The display control module 54 comprises the displaying electromagnet 36 and erasing electro-magnet 38. The function of the displaying electromagnet and the erasing electromagnet are similar to what was mentioned before.

In another embodiment, the electronic device 50 comprises four display control modules 54, and the battery comprises four display modules 48. When the battery is in full power capacity, the power detector 52 outputs the first signal to all four of the display control modules 54, so as to enable the display control modules 54 to be electrified and to keep the four display modules 48 to all remain in the first displaying state; that is, the four display modules 48 are all in the state of black. When the power of the battery 44 decreases to three-fourth, the power detector 52 outputs the second signal to one of the four display control modules 54, so that one of the four display modules 54 is switched from the first displaying state to the second state under magnetic force; that is, there are now three display modules 54 in the state of black. Under this mechanism, as the power in the battery gradually decreases, the plural display control modules 54 gradually outputs the second signal one at a time, so as to enable the plural display modules 48 to change from the first displaying state to the second state one at a time; that is, the display modules 48 that are in the state of black gradually decrease to reflect the remaining power of the battery 44.

Figure 7:
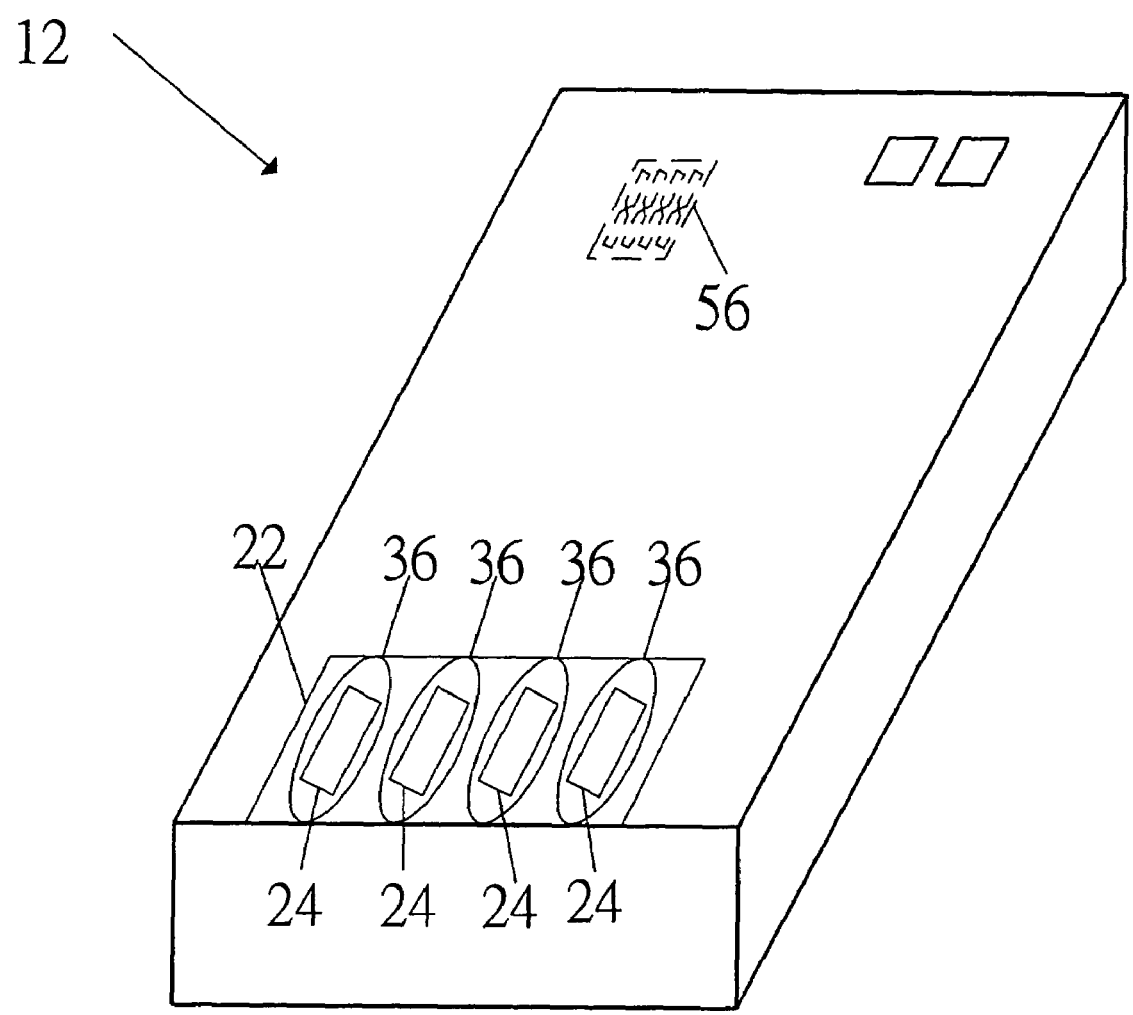
FIG. 7 is a schematic diagram of the other embodiment of the present invention of FIG. 1.
Figure 8:
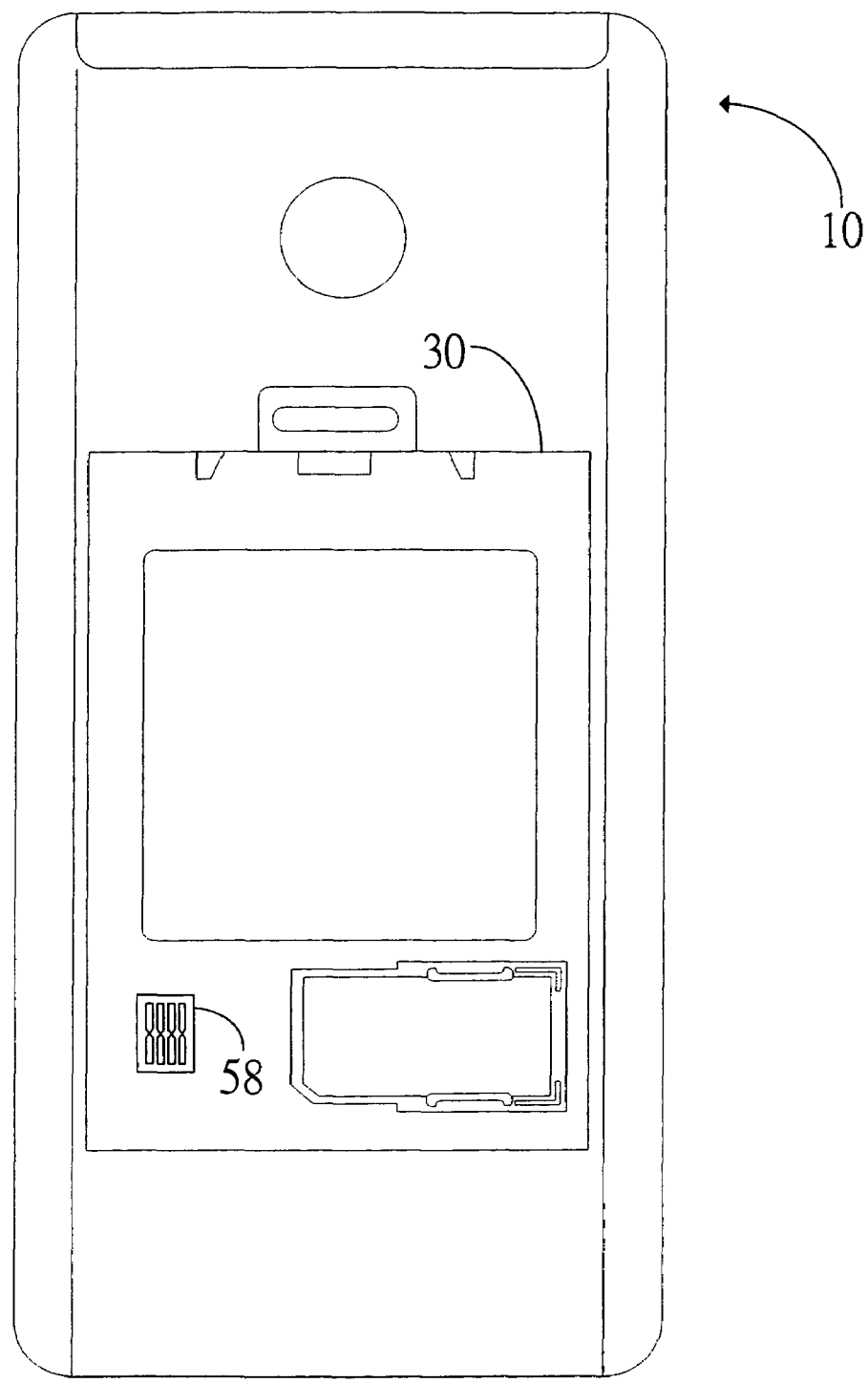
FIG. 8 is a schematic diagram of the other embodiment of the electronic device of FIG. 1.

Please refer to FIG. 7 and FIG. 8. FIG. 7 is a schematic diagram of the other embodiment of the present invention of FIG. 1. FIG. 8 is a schematic diagram of the other embodiment of the electronic device of FIG. 1. In this embodiment, the above-mentioned display control module 54 is not placed on the surface of the battery 44 but in the electronic device 50. All the other devices are similar to the above mentioned. As shown in FIG. 7, besides comprising the above-mentioned devices, the battery 12 further comprises the display control modules 54 and a first connecting point 56. The display control modules 54 comprise a plurality of displaying electromagnets 36 and erasing electromagnets 38. As mentioned above, the plural displaying electromagnets 36 and erasing electromagnets 38 are correspondingly placed on the top and bottom of each of the display modules 24. The first connecting point 56 is used for the connection of the electronic device and the power detector 52. As shown in FIG. 8, besides comprising the display control module 54, the electronic device further comprises all the devices mentioned in the above electronic device 50. The electronic device further comprises a second connecting point 58, which is placed in a position corresponding the first connecting point 56. When the battery 12 is placed in the electronic device 50, the first connecting point 56 and the second connecting point 58 form an electronic connection, so that the power detector 52 is capable of controlling the display control module 54.

In the present invention, besides in the form of the magnetic powder plate or the electrical paper, the display module 48 can be replaced by other devices. The replacing devices of the display module 48 must be cost efficient and smaller, and it must be able to be placed in the electronic device or a proper battery charger of the battery. In addition, the replacing devices can be electronically changed in its appearance by the electronic device for displaying the remaining power. After changing its appearance, the display module 48 still retains its appearance for a period of time.

Figure 9:
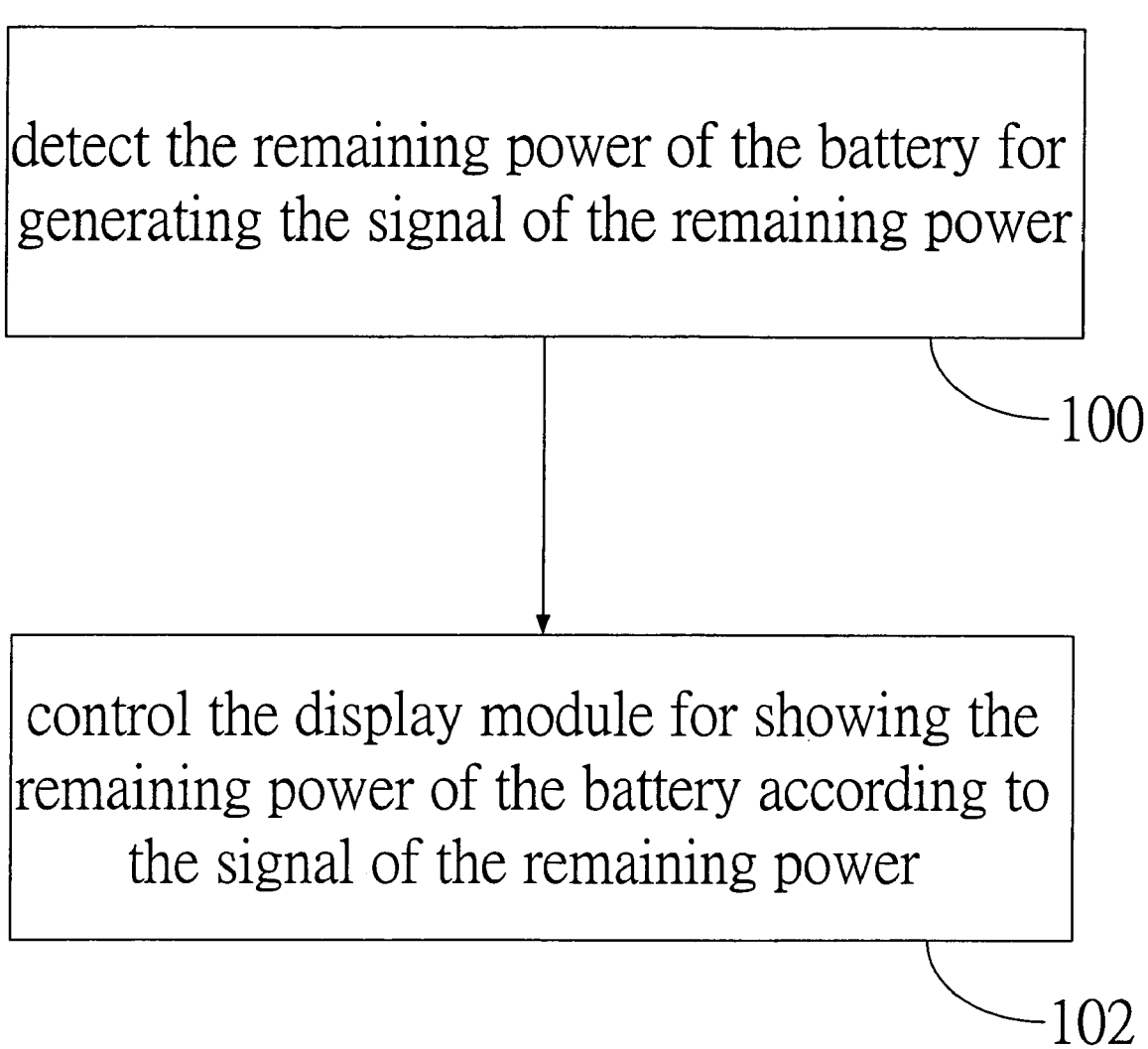
FIG. 9 is a flow chart of the power displaying method of the present invention.

As shown in FIG. 9, FIG. 9 is a flow chart of the power displaying method of the present invention. The present invention provides an electronic device with a battery and a method of display remaining power. As in step 100, the electronic device first detects the remaining power of the battery, and when the remaining power changes, the electronic device outputs the signal of remaining power. As in step 102, the present invention controls a display module for showing the remaining power of the battery according to the signal of the remaining power. Within this method, a display control module controls the display module, and when detached from the display control module, the display module still shows the remaining power of the battery.

Compared with the prior, the prevent invention provides an electronic device with a battery and a method to display remaining power. After being detached from the electronic device, the battery still shows the remaining power of the battery; thus, the users can distinguish the remaining power of batteries without the other electronic devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:
   a battery comprising a power storage unit for storing electrical power, and a display module placed on the surface of the battery, the display module being a magnetic powder plate comprising a plurality of magnetic display units;
   a power detector selectively coupled to the battery, and generating a remaining power signal to indicate the electrical power stored in the battery when the power detector is coupled to the battery; and
   a display control module receiving the remaining power signal to control the display module;
   wherein when the battery is coupled to the power detector, the display control module controls the display module to show a remaining power display corresponding to the remaining power signal; and when the battery is separated from the power detector, the display module is out of the control of the display control module but substantially keeps showing the remaining power display.

2. The electronic device of claim 1, wherein the display control module comprises a plurality of displaying electromagnets, and each of the displaying electro-magnet is placed on the top of the corresponding magnetic display units.

3. The electronic device of claim 2, wherein the remaining power signal comprises a plurality of sub remaining power signals, and each sub remaining power signal is responsible for magnetizing a corresponding displaying electro-magnet for controlling a corresponding magnetic display unit to display a magnetization status, so as to enable the correct display of the remaining power of the battery by the magnetic display units in totality.

4. The electronic device of claim 2, wherein the plurality of the displaying electro-magnets are usually non-electrified, and when the displaying electro-magnet is required to change the displaying state, at least one of the plurality of the displaying electro-magnets is electrified.

5. The electronic device of claim 1, wherein the display control module comprises a plurality of erasing electro-magnets, and each erasing electro-magnet is placed under a corresponding magnetic display unit.

6. The electronic device of claim 5, wherein the remaining power signal comprises a plurality of sub remaining power signals, and each sub remaining power signal is responsible for magnetizing a corresponding erasing electro-magnet for controlling a corresponding magnetic display unit to erase a magnetization status, so as to enable the correct display of the remaining power of the battery by the magnetic display units in totality.

7. The electronic device of claim 5, wherein the plurality of the erasing electro-magnets are usually non-electrified, and when the displaying electro-magnet is required to change the displaying state, at least one of the plurality of the displaying erasing-magnets are electrified.

8. A combination of an electronic device and a battery, comprising:
- a battery comprising a power storage unit for storing electrical power, and a display module placed on the surface of the battery, the display module being a magnetic powder plate;
- a power detector selectively coupled to the battery, and generating a remaining power signal to indicate the electrical power stored in the battery when the power detector is coupled to the battery; and
- a display control module, placed on the electronic device and electrically coupling to the power detector, for controlling, based on the remaining power signal, the display module positioned within an exerting range to switch between a first displaying state and a second displaying state;
- wherein, when the battery is coupled to the power detector and the power detector detects that the power of the battery is higher than a predetermined value, the power detector outputs a first signal to control the display control module, so as to make the display module show the first displaying state;
- wherein, when the battery is coupled to the power detector and the power detector detects that the power of the battery is lower than the predetermined value, the power detector outputs a second signal to control the display control module, so as to make the display module show the second displaying state; and
- wherein, after the battery is separated from the electronic device, the display module is out of the exerting range of the display control module, but the display module substantially keeps showing one of the first displaying state and the second displaying state.

9. The combination of claim 8, wherein the display control module is usually non-electrified, and when the display module is switched between the first displaying state and the second displaying state, the display control module is electrified.

10. The combination of claim 8, wherein the electronic device further comprises a plurality of display control modules, the battery further comprises a plurality of display modules, and during the power decreasing process in the battery, the power detector gradually outputs each of the second signals to the display control module, so that each of the plurality of display modules gradually changes from the first displaying state into the second displaying state.

11. The combination of claim 10, wherein the electronic device comprises four display control modules, and the battery comprises four display modules, and wherein when the battery is in a full power capacity, the power detector outputs the first signal to the display control modules so as to keep the four display modules to all remain in the first displaying state; and when the power of the battery decreases to three-fourth, the power detector outputs the second signal to one of the four display control modules so that one of the four display modules changes from the first displaying state to the second state.

12. The combination of claim 10, wherein the plural display control modules comprise a plurality of displaying electro-magnets and erasing electro-magnets placed, respectively, on the top and the bottom of each of the display modules.

13. The combination of claim 12, wherein the first signal is for magnetizing the plurality of displaying electro-magnets to enable the first displaying state of the corresponding magnetic powder plate, and the second signal is for magnetizing the plurality of erasing electro-magnet to enable the second displaying state of the corresponding magnetic powder plate.

14. A method of power displaying in an electronic device, the method comprising:
- detecting remaining power of a battery to generate a remaining power signal; and
- controlling a display module to show a remaining power display according to the remaining power signal;
- wherein the display module is a magnetic powder plate comprising a plurality of magnetic display units, the display module is controlled by a display control module when the display module is positioned within an exerting range of the display control module, and the display module is substantially showing the remaining power display when the display module is placed out of the exerting range of the display control module.

15. The method of power displaying of claim 14, wherein the display control module comprises a combination of plural displaying electro-magnets and plural erasing electro-magnets.

16. A method of status display in an electronic device, the electronic device being detachably connected to an external unit and comprising a display module placed on a surface of the electronic device to indicate a current status of the electronic device, the display module being controlled by a display control module, the display module being a magnetic powder plate comprising a plurality of magnetic display units, the method comprising:
- detecting a current status of the electronic device by connecting the electronic device with the external unit to generate a status signal;
- the display control module controlling the display module to show the current status of the electronic device according to the status signal; and
- separating the external unit from the electronic device wherein when the display module is beyond the control of the display control module, the display module still substantially shows the current status of the electronic device;
- wherein the external unit is a detector to detect remaining power of a battery of the electronic device and the status signal is a remaining power signal.

17. The method of claim 16, wherein the display control module comprises a combination of plural displaying electro-magnets and plural erasing electro-magnets.

* * * * *